United States Patent
Wan et al.

(10) Patent No.: US 12,137,235 B2
(45) Date of Patent: Nov. 5, 2024

(54) METHOD FOR PICTURE PREDICTION, ENCODER, DECODER, AND STORAGE MEDIUM

(71) Applicant: GUANGDONG OPPO MOBILE TELECOMMUNICATIONS CORP., LTD., Guangdong (CN)

(72) Inventors: Shuai Wan, Guangdong (CN); Junyan Huo, Guangdong (CN); Yanzhuo Ma, Guangdong (CN); Wei Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 264 days.

(21) Appl. No.: 17/482,191

(22) Filed: Sep. 22, 2021

(65) Prior Publication Data

US 2022/0014765 A1    Jan. 13, 2022

Related U.S. Application Data

(63) Continuation of application No. PCT/CN2019/110809, filed on Oct. 12, 2019.
(Continued)

(51) Int. Cl.
*H04N 19/186* (2014.01)
*H04N 19/176* (2014.01)
*H04N 19/59* (2014.01)

(52) U.S. Cl.
CPC ......... *H04N 19/186* (2014.11); *H04N 19/176* (2014.11); *H04N 19/59* (2014.11)

(58) Field of Classification Search
CPC ..... H04N 19/186; H04N 19/176; H04N 19/59
(Continued)

(56) References Cited

U.S. PATENT DOCUMENTS

| 8,724,711 B2 | 5/2014 | Xu et al. |
| 9,288,500 B2 | 3/2016 | Budagavi |

(Continued)

FOREIGN PATENT DOCUMENTS

| CN | 106576164 A | 4/2017 |
| CN | 107079166 A | 8/2017 |

(Continued)

OTHER PUBLICATIONS

Kai Zhang et al., "Multi-model based cross-component linear model chroma intra-prediction for video coding", dated Dec. 13, 2017.
(Continued)

*Primary Examiner* — Nguyen T Truong
(74) *Attorney, Agent, or Firm* — Perkins Coie LLP

(57) ABSTRACT

A method for picture prediction, an encoder, a decoder, and a storage medium are provided. The method includes the following. At least one colour component of a current block in a picture is determined. The at least one colour component of the current block is pre-processed to obtain at least one pre-processed colour component. A prediction model is constructed according to the at least one pre-processed colour component, where the prediction model is used to perform cross-component prediction on the at least one colour component of the current block.

16 Claims, 5 Drawing Sheets

Related U.S. Application Data

(60) Provisional application No. 62/823,602, filed on Mar. 25, 2019.

(58) Field of Classification Search
USPC .................................................. 375/240.12
See application file for complete search history.

(56) References Cited

U.S. PATENT DOCUMENTS

| | | | |
|---|---|---|---|
| 9,723,327 | B2 | 8/2017 | Budagavi |
| 9,998,742 | B2 | 6/2018 | Chen et al. |
| 10,200,719 | B2 | 2/2019 | Zhang et al. |
| 2015/0382016 | A1 | 12/2015 | Cohen et al. |
| 2016/0219283 | A1* | 7/2016 | Chen ............... H04N 19/105 |
| 2016/0277762 | A1 | 9/2016 | Zhang et al. |
| 2019/0089983 | A1 | 3/2019 | Choe et al. |

FOREIGN PATENT DOCUMENTS

| | | |
|---|---|---|
| CN | 107211124 A | 9/2017 |
| CN | 107409209 A | 11/2017 |
| CN | 107580222 A | 1/2018 |
| CN | 108464002 A | 8/2018 |
| CN | 113766233 B | 5/2023 |
| JP | 2018514119 A | 5/2018 |
| JP | 2018107692 A | 7/2018 |
| RU | 2604669 C2 | 12/2016 |
| WO | 2016065538 A1 | 5/2016 |
| WO | 2016066028 A1 | 5/2016 |
| WO | 2016154008 A1 | 9/2016 |
| WO | 2017059926 A1 | 4/2017 |
| WO | 2017091759 A1 | 6/2017 |
| WO | 2018070914 A1 | 4/2018 |

OTHER PUBLICATIONS

International search report issued in corresponding international application No. PCT/CN2019/110809 dated Jan. 16, 2020.
Communication pursuant to Article 94(3) EPC issued in corresponding European application No. 19920728.3 dated Feb. 2, 2023. 7 pages.
Office Action issued in corresponding RU Application No. 2021130793 dated Mar. 24, 2023. 20 pages with English translation.
The first office action issued in corresponding CN application No. 202111034246.7 dated Sep. 29, 2022. 27 pages.
First examination report issued in corresponding IN application No. 202117047089 dated Apr. 18, 2022. 6 pages with English translation.
Filippov (Huawei) A et al: "CE1-related: Simplification of LIC parameter derivation and its unification with CCLM", JVET-N0410-v1; JVET of ITU-T SG 16 WP 3 and ISO/IEC JTC 1/SC 29/WG 11; 14th Meeting; Geneva, CH; Mar. 19-27, 2019. 4 pages.
Huo J et al: "CE3-1.5: CCLM derived from four neighbouring samples", JVET-N0271-v3; JVET of ITU-T SG 16 WP 3 and ISO/IEC JTC 1/SC 29/WG 11; 14th Meeting; Geneva, CH; Mar. 19-27, 2019. 3 pages.
Extended European search report issued in corresponding European application No. 19920728.3 dated May 13, 2022. 6 pages.
Summons to Attend Oral Proceedings issued in corresponding European application No. 19920728.3 dated Sep. 4, 2023. (5 pages).
Office Action issued in corresponding ID application No. P00202108514 dated Sep. 25, 2023. (6 pages with English translation).
Office Action issued in corresponding VN application No. 1-2021-06683 dated Aug. 24, 2023. (4 pages with English translation).
Notice of Reasons for Refusal issued in corresponding JP Application No. 2021-557116 dated Nov. 7, 2023. (18 pages with English translation).
Office Action issued in corresponding RU Application No. 2023125354 dated Mar. 1, 2024. (20 pages with English translation).
Hearing Notice issued in corresponding IN Application No. 202117047089 dated Mar. 7, 2024. (2 pages).
Huawei Technologies Co., A. Filippov, et al, "CE1-related: Simplification of LIC parameter derivation and its unification with CCLM", Joint Video Experts Team (JVET) of ITU-T SG 16 WP 3 and ISO/IEC JTC 1/SC 29/WG 11 14th Meeting: Geneva, CH, Mar. 19-27, 2019, JVET-N0410-v1. (4 pages).
Extended European Search Report issued in corresponding EP application No. 24176095.8 dated Aug. 16, 2024. 29 pages.

* cited by examiner

METHOD FOR PICTURE PREDICTION, ENCODER, DECODER, AND STORAGE MEDIUM

CROSS-REFERENCE TO RELATED APPLICATION (S)

This application is a continuation of International Application No. PCT/CN2019/110809, filed on Oct. 12, 2019, which claims priority to U.S. Provisional Application No. 62/823,602, filed on Mar. 25, 2019, the disclosures of which are hereby incorporated by reference in their entireties.

TECHNICAL FIELD

This disclosure relates to the technical field of video coding, and particular to a method for picture prediction, an encoder, a decoder, and a storage medium.

BACKGROUND

In recent video coding standard, e.g., H.266/versatile video coding (VVC), cross-component prediction has been allowed. Cross-component linear model (CCLM) prediction is one of the typical cross-component prediction technologies. Through cross-component prediction technology, it is possible to predict one component (or its residual) through another component, such as prediction of a chroma component through a luma component, or vice versa. Prediction between chroma components is also possible.

Since different components have different statistical characteristics, there is a difference in the statistical characteristics of various components. However, in component prediction, the difference in the statistical characteristics of various components has not been considered in the related cross-component prediction technology, which leads to low prediction efficiency.

SUMMARY

According to a first aspect, a method for picture prediction is provided. The method is implemented in an encoder and includes the following.

At least one colour component of a current block in a picture is determined. The at least one colour component of the current block is pre-processed to obtain at least one pre-processed colour component. A prediction model is constructed according to the at least one pre-processed colour component, where the prediction model is used to perform cross-component prediction on the at least one colour component of the current block.

According to a second aspect, a method for picture prediction is provided. The method is implemented in a decoder and includes the following.

At least one colour component of a current block in a picture is determined. The at least one colour component of the current block is pre-processed to obtain at least one pre-processed colour component. A prediction model is constructed according to the at least one pre-processed colour component, where the prediction model is used to perform cross-component prediction on the at least one colour component of the current block.

According to a third aspect, an encoder is provided. The encoder includes a memory and a processor. The memory is configured to store computer programs than can be run on the processor. The processor is configured to execute the method of the first aspect when running the computer programs.

According to a fourth aspect, a decoder is provided. The decoder includes a memory and a processor. The memory is configured to store computer programs than can be run on the processor. The processor is configured to execute the method of the second aspect when running the computer programs.

DETAILED DESCRIPTION

To better understand features and technical contents of implementations, the implementations will be described in detail below with reference to the accompanying drawings. The attached drawings are merely for reference and description, but are not used to limit the implementations.

In a picture of a video, a first colour component, a second colour component, and a third colour component are generally used to indicate a coding block. The first colour component, the second colour component, and the third colour component are respectively a luma component, a blue chroma component, and a red chroma component. For example, the luma component is generally represented by a symbol Y, the blue chroma component is generally represented by a symbol Cb or U, and the red chroma component is generally represented by a symbol Cr or V. In this way, the picture can be expressed in the format of YCbCr or YUV.

In the implementations, the first colour component is a luma component, the second colour component is a blue chroma component, and the third colour component is a red chroma component, which is not limited herein.

To further improve decoding performance, a cross-component prediction technology based on cross-component linear model (CCLM) is provided in H.266/versatile video coding (VVC). Through the cross-component prediction technology based on CCLM, it is possible to achieve the prediction from the luma component to the chroma component, that is, the prediction from the first colour component to the second colour component, or from the first colour component to the third colour component. It is also possible to achieve the prediction from the chroma component to the luma component, that is, the prediction from the second colour component to the first colour component or from the third colour component to the first colour component. It is even possible to achieve the prediction between the chroma components, that is, the prediction from the second colour component to the third colour component or from the third colour component to the second colour component, and the like. In the following implementations, the prediction from the first colour component to the second colour component is taken as an example for description, but the technical solutions of the implementations can also be applied to the prediction of other colour components.

Figure 1:
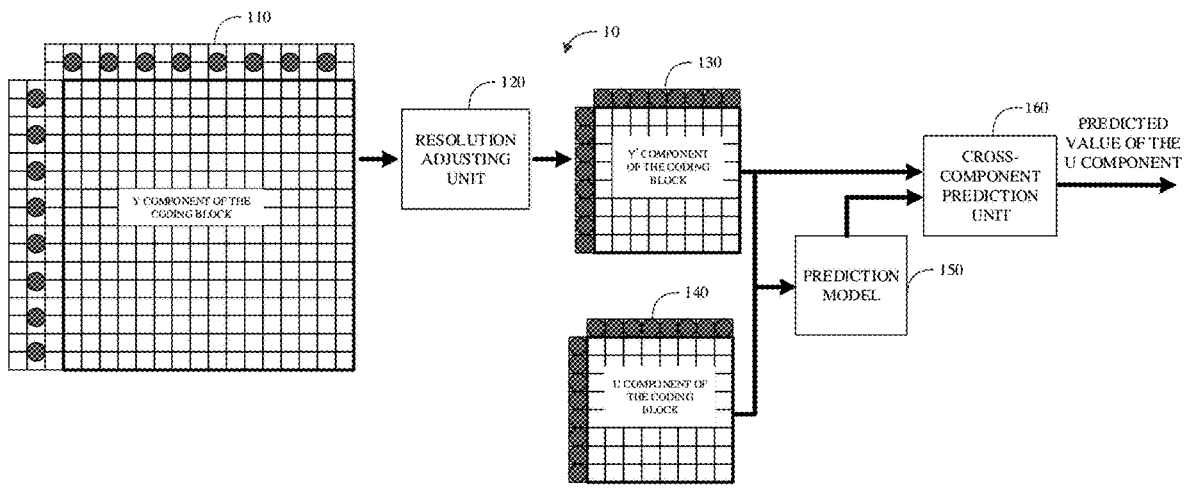
FIG. 1 is a schematic structural diagram of a related architecture for cross-component prediction according to implementations.

FIG. 1 is a schematic structural diagram of a related architecture for cross-component prediction according to implementations. As illustrated in FIG. 1, the first colour component (for example, represented by the Y component) is used to predict the second colour component (for example, represented by the U component). Assuming that the picture has the YUV format of 4:2:0, the Y component and the U component have different resolutions. In this case, it is necessary to perform down-sampling on the Y component or up-sampling on the U component, to obtain a target resolution of the component to-be-predicted, so that the prediction can be performed at the same resolution between the components. In this example, the way of prediction of the third colour component (for example, represented by the V component) using the Y component is similar.

In FIG. 1, the related architecture 10 for cross-component prediction includes a Y component 110 of a coding block, a resolution adjusting unit 120, a $Y^1$ component 130 of the coding block, a U component 140 of the coding block, a prediction model 150, and a cross-component prediction unit 160. The Y component of the picture is represented by the Y component 110 of the coding block with a size of 2N×2N. Herein, the larger bolded box is used to highlight the Y component 110 of the coding block and the surrounding gray solid circles are used to indicate neighbouring reference values of the Y component 110 of the coding block. The U component of the picture is represented by the U component 140 of the coding block with a size of N×N. Herein, the larger bolded box is used to highlight the U component 140 of the coding block and the surrounding gray solid circles are used to indicate neighbouring reference values of the U component 140 of the coding block. Since the Y component and the U component have different resolutions, the resolution adjusting unit 120 needs to adjust the resolution of the Y component, to obtain the $Y^1$ component 130 of the coding block with a size of N×N. For the $Y^1$ component 130 of the coding block, herein, the larger bolded box is used to highlight the $Y^1$ component 130 of the coding block and the surrounding gray solid circles are used to indicate neighbouring reference values $Y^1(n)$ of the $Y^1$ component 130 of the coding block. Then, the prediction model 150 can be constructed using the neighbouring reference values $Y^1(n)$ of the $Y^1$ component 130 of the coding block and the neighbouring reference values $C(n)$ of the U component 140 of the coding block. According to reconstructed sample values of the $Y^1$ component 130 of the coding block and the prediction model 150, component prediction can be performed by the cross-component prediction unit 160, and finally a predicted value of the U component is output.

For the related architecture 10 for cross-component prediction, in colour component prediction, some certain factors are not considered, for example, the difference in statistical characteristics of various colour components is not considered, which leads to low prediction efficiency. To improve the prediction efficiency, a method for picture prediction is provided in the implementations. At least one colour component of a current block in a picture is determined. The at least one colour component of the current block is pre-processed to obtain at least one pre-processed colour component. A prediction model is constructed according to the at least one pre-processed colour component, where the prediction model is used to perform cross-component prediction on the at least one colour component of the current block. In this way, before cross-component prediction is performed on the at least one colour component of the current block, the least one colour component is pre-processed, to balance statistical characteristics of various colour components before cross-component prediction, thereby improving the prediction efficiency as well as coding efficiency in video coding.

The following will describe the implementations in conjunction with the accompanying figures.

Figure 2:
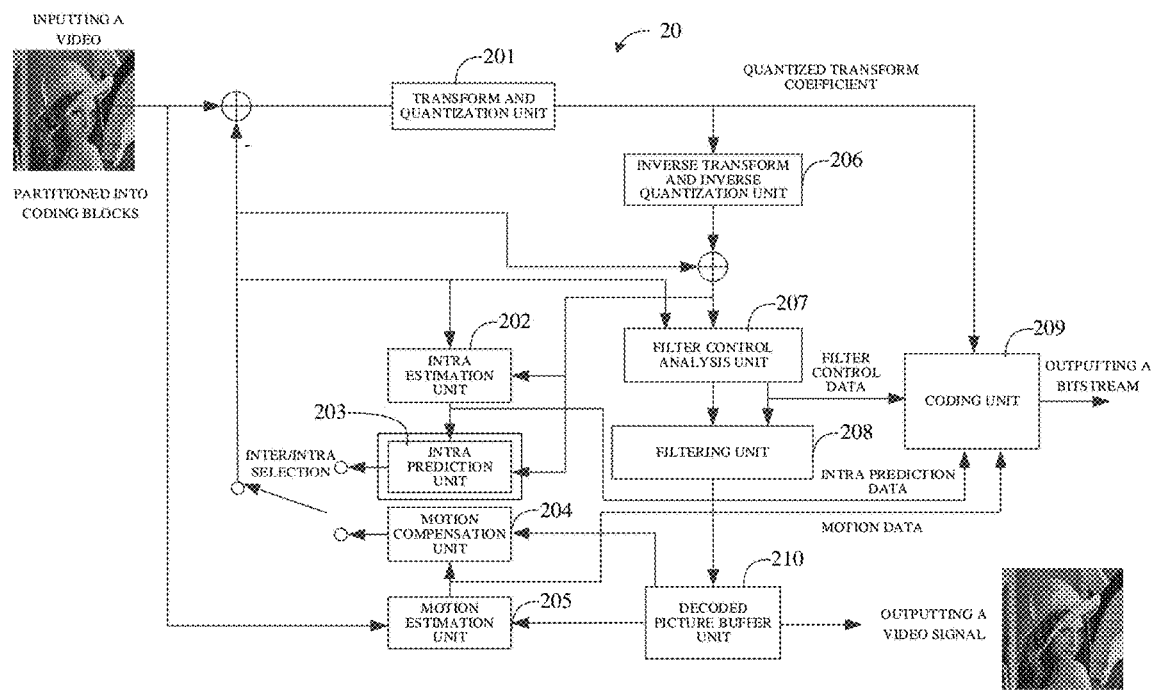
FIG. 2 is a schematic structural diagram of a video encoding system according to implementations.

FIG. 2 is a schematic structural diagram of a video encoding system according to implementations. As illustrated in FIG. 2, the video encoding system 20 includes a transform and quantization unit 201, an intra estimation unit 202, an intra prediction unit 203, a motion compensation unit 204, a motion estimation unit 205, an inverse transform and inverse quantization unit 206, a filter control analysis unit 207, a filtering unit 208, a coding unit 209, and a decoded picture buffer unit 210, etc. The filtering unit 208 can implement deblocking filtering and sample adaptive offset (SAO) filtering, and the coding unit 209 can implement header information encoding and context-based adaptive binary arithmetic coding (CABAC). For an input original video signal, one coding block can be obtained through partition of a coding tree unit (CTU). Then, for the residual sample information obtained after intra prediction or inter prediction, the coding block is transformed by the transform and quantization unit 201, including transforming the residual information from the sample domain to the transform domain, and the obtained transform coefficients are quantized, to further reduce the bit rate. The intra estimation unit 202 and the intra prediction unit 203 are used to perform intra prediction on the coding block. In an example, the intra estimation unit 202 and the intra prediction unit 203 are used to determine an intra prediction mode to-be-used to encode the coding block. The motion compensation unit 204 and the motion estimation unit 205 are used to perform inter prediction on the received coding block relative to one or more blocks in one or more reference pictures, to provide temporal prediction information. The motion estimation performed by the motion estimation unit 205 is a process of generating a motion vector, where the motion vector can estimate motion of the coding block. The motion compensation unit 204 is used to perform motion compensation based on the motion vector determined by the motion estimation unit 205. After the intra prediction mode is determined, the intra prediction unit 203 is used to provide the selected intra prediction data to the coding unit 209 and the motion estimation unit 205 is used to send the calculated motion vector data to the coding unit 209. In addition, the inverse transform and inverse quantization unit 206 is used for reconstruction of the coding block. A residual block is reconstructed in the sample domain, and blockiness artifacts of the reconstructed residual block are removed through the filter control analysis unit 207 and the filtering unit 208, and then the reconstructed residual block is added to a prediction of the picture in the decoded picture buffer unit 210, to generate a reconstructed coding block. The coding unit 209 is used to encode various encoding parameters and quantized transform coefficients. In the CABAC-based encoding algorithm, the context can be based on neighbouring coding blocks, and the coding unit 209 can be used to encode information indicating the determined intra prediction mode and output the bitstream of the video signal. The decoded picture buffer unit 210 is used to store reconstructed coding blocks, for prediction reference. As the picture encoding progresses, reconstructed coding blocks will be continuously generated, and these reconstructed coding blocks will be stored into the decoded picture buffer unit 210.

Figure 3:
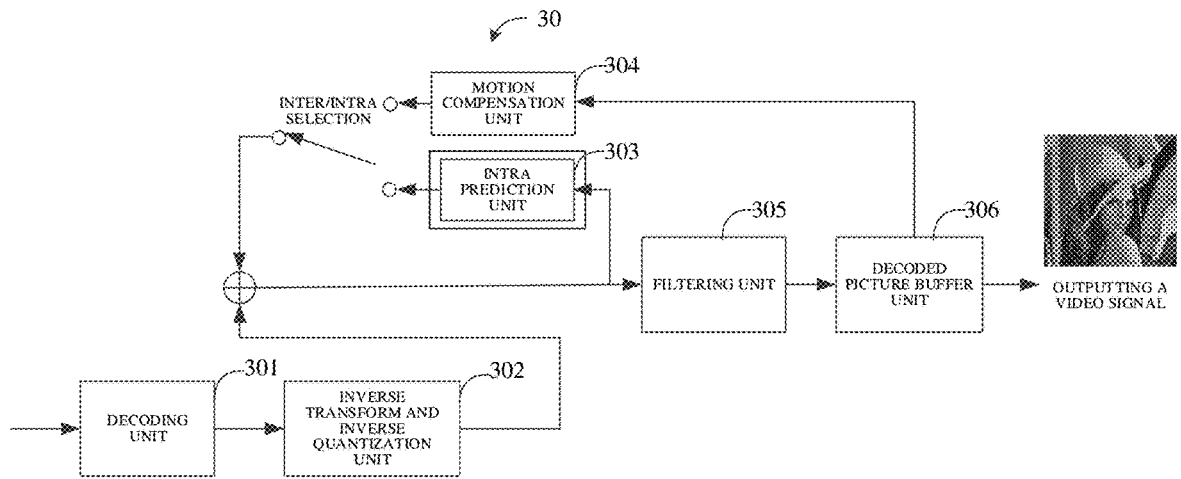
FIG. 3 is a schematic structural diagram of a video decoding system according to implementations.

FIG. 3 is a schematic structural diagram of a video decoding system according to implementations. As illustrated in FIG. 3, the video decoding system 30 includes a decoding unit 301, an inverse transform and inverse quantization unit 302, an intra prediction unit 303, a motion compensation unit 304, a filtering unit 305, a decoded picture buffer unit 306, and the like. The decoding unit 301 can implement header information decoding and CAB AC, and the filtering unit 305 can implement deblocking filtering and SAO filtering. After the input video signal is encoded (as illustrated in FIG. 3), the bitstream of the video signal is output. The bitstream is input into the video decoding system 30. First, decoded transform coefficients are obtained through the decoding unit 301. The decoded transform coefficients are processed by the inverse transform and inverse quantization unit 302, so as to generate a residual block in the sample domain. The intra prediction unit 303 may be used to generate prediction data of the current coding block to-be-decoded based on the determined intra prediction mode and data from the previous decoded block of the current frame or picture. The motion compensation unit 304 is used to determine prediction information for the coding block to-be-decoded by analyzing motion vectors and other associated syntax elements, and use the prediction information to generate a prediction of the coding block that is being decoded. The decoded block is formed by summing the residual block from the inverse transform and inverse quantization unit 302 and the corresponding prediction generated by the intra prediction unit 303 or the motion compensation unit 304. The blockiness artifacts of the decoded block are removed through the filtering unit 305, which can improve quality of the video. The decoded block is then stored into the decoded picture buffer unit 306. The decoded picture buffer unit 306 is used to store reference pictures used for subsequent intra prediction or motion compensation, and is also used to output the video signal, that is, the restored original video signal is obtained.

The implementations can be applied to the intra prediction unit 203 illustrated in FIG. 2 and the intra prediction unit 303 illustrated in FIG. 3. That is, the implementations can be applied to a video encoding system and can also be applied to a video decoding system, which is not limited herein.

Figure 4:
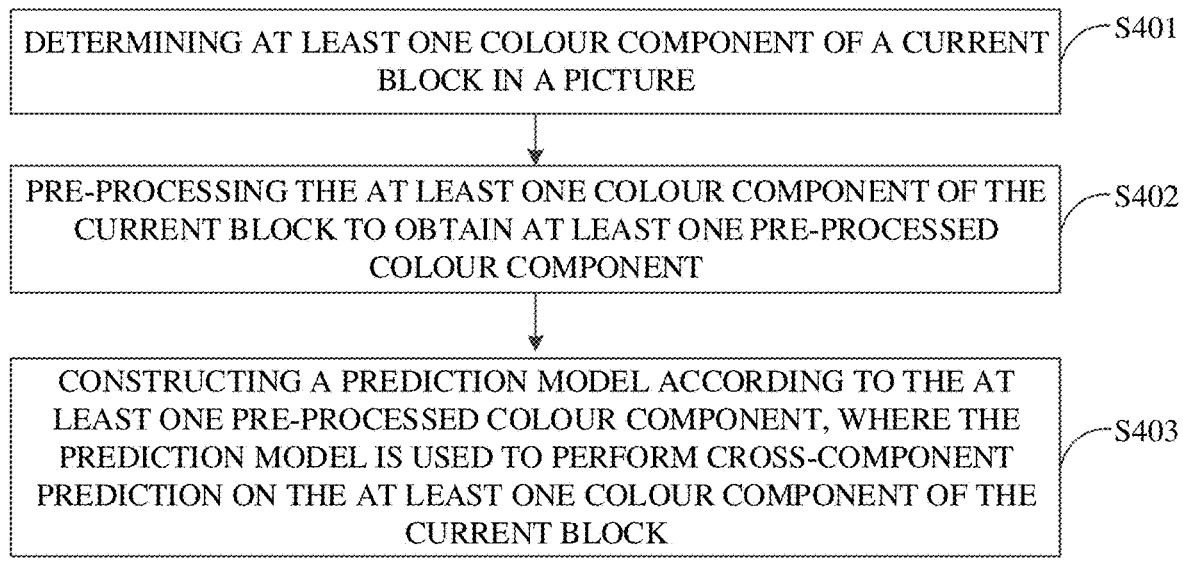
FIG. 4 is a schematic flowchart of a method for picture prediction according to implementations.

Based on the above application scenarios in FIG. 2 or FIG. 3, FIG. 4 is a schematic flowchart of a method for picture prediction according to implementations. The method includes the following.

At S401, at least one colour component of a current block in a picture is determined.

At S402, the at least one colour component of the current block is pre-processed to obtain at least one pre-processed colour component.

At S403, a prediction model is constructed according to the at least one pre-processed colour component, where the prediction model is used to perform cross-component prediction on the at least one colour component of the current block.

It is to be noted that, the picture of the video can be partitioned into multiple picture blocks, and each picture block currently to be encoded can be called a coding block. Each coding block may include a first colour component, a second colour component, and a third colour component. The current block is a coding block in the picture for which prediction of the first colour component, the second colour component, or the third colour component is currently to be performed.

It is also to be noted that, the method for picture prediction of the implementation can be applied to a video encoding system or a video decoding system, or even can be applied to both the video encoding system and the video decoding system, which is not limited herein.

According to the implementation, the at least one colour component of the current block in the picture is determined; the at least one colour component of the current block is pre-processed to obtain the at least one pre-processed colour component; the prediction model is constructed according to the at least one pre-processed colour component, where the prediction model is used to perform cross-component prediction on the at least one colour component of the current block. In this way, before cross-component prediction is performed on the at least one colour component of the current block, the least one colour component is pre-processed, to balance statistical characteristics of various colour components before cross-component prediction, thereby improving prediction efficiency as well as coding efficiency in video coding.

Furthermore, different colour components have different statistical characteristics, i.e., there is a difference in the statistical characteristics of various colour components. For example, the luma component has rich texture characteristics while the chroma component tends to be more uniform and flat. In the implementation, the difference in the statistical characteristics of various colour components are considered to balance the statistical characteristics of various colour components. In some implementations, after determining the at least one colour component of the current block in the picture, the following is further performed.

Characteristic statistics is performed on the at least one colour component of the current block, where the at least one colour component includes a first colour component, or a second colour component, or the first colour component and the second colour component.

A reference value of the first colour component of the current block, or a reference value of the second colour component of the current block, or the reference value of the first colour component and the reference value of the second colour component is obtained according to a result of characteristic statistics, where the first colour component is a component used for prediction when the prediction model is constructed, and the second colour component is a component that is predicted when the prediction model is constructed.

It is to be noted that, the at least one colour component of the current block may be the first colour component, the second colour component, or even the first colour component and the second colour component. The first colour component is a component used for prediction when the prediction model is constructed, which is also referred to as a colour component to-be-referenced. The second colour component is a component that is predicted when the prediction model is constructed, which is also referred to as a colour component to-be-predicted.

Assuming that the prediction of the luma component to the chroma component is achieved through the prediction model, the component used for prediction when the prediction model is constructed is the luma component, and the component that is predicted when the prediction model is constructed is the chroma component. That is, the first colour component is the luma component, and the second colour component is the chroma component. Alternatively, assuming that the prediction of the chroma component to the luma component is achieved through the prediction model, the component used for prediction when the prediction model is constructed is the chroma component, and the component that is predicted when the prediction model is constructed is the luma component. That is, the first colour component is the chroma component, and the second colour component is the luma component.

In this way, through performing characteristic statistics on the at least one colour component of the current block, the result of characteristic statistics can be obtained. According to the result of characteristic statistics, the reference value of the first colour component of the current block and/or the reference value of the second colour component of the current block can be obtained.

Furthermore, to improve prediction efficiency, the difference in the statistical characteristics of various colour components are considered. That is, before performing cross-component prediction on the at least one colour component through the prediction model, the at least one colour component is pre-processed according to statistical characteristics of the at least one colour component, for example, filtering, grouping, value modification, quantization, or de-quantization. In some implementations, for S402, the at least one colour component of the current block is pre-processed to obtain the at least one pre-processed colour component as follows.

A first processing is performed on the first colour component using a preset processing mode, based on the reference value of the first colour component of the current block, or the reference value of the second colour component of the current block, or the reference value of the first colour component and the reference value of the second colour component, where the preset processing mode includes at least one of: filtering, grouping, value modification, quantization, or de-quantization.

A processed value of the first colour component of the current block is obtained according to a result of the first processing.

It is to be noted that, after the reference value of the first colour component of the current block and/or the reference value of the second colour component of the current block is obtained according to the result of characteristic statistics of the at least one colour component of the current block, the first processing is performed on the first colour component using the preset processing mode. For example, the first processing is performed on the first colour component using filtering. For another example, the first processing is performed on the first colour component using grouping. For yet another example, the first processing is performed on the first colour component using value modification. For still another example, the first processing is performed on the first colour component using quantization. For still another example, the first processing is performed on the first colour component using inverse quantization (also called de-quantization). The disclosure is not limited thereto.

It is also to be noted that, for processing the first colour component, neighbouring reference sample values of the first colour component can be processed, or reconstructed sample values of the first colour component can be processed, or even other sample values of the first colour component can be processed. In the implementation, what is processed is determined according to the actual situation of the prediction model, which is not limited herein.

Assuming that the prediction model is used to predict the chroma component using the luma component, to improve the prediction efficiency, i.e., improve accuracy of a predicted value(s), the luma component and/or the chroma component needs to be processed according to the preset processing mode, for example, reconstructed sample values of the luma component are processed according to the preset processing mode. If the preset processing mode is value modification, since the luma component and the chroma component have different statistical characteristics, a deviation factor can be obtained according to the difference in the statistical characteristics of the two colour components (i.e., the luma component and the chroma component). Then, the deviation factor is used to perform value modification on the luma component, for example, the deviation factor is added to each of the reconstructed sample values of the luma component, to balance the statistical characteristics of the two colour components before cross-component prediction. As a result, the processed luma component is obtained. In this case, the predicted value of the chroma component predicted according to the prediction model is closer to the true value of the chroma component. If the preset processing mode is filtering, since the luma component and the chroma component have different statistical characteristics, according to the difference in the statistical characteristics of the two colour components, the luma component is filtered, to balance the statistical characteristics of the two colour components before cross-component prediction. As a result, the processed luma component is obtained. In this case, the predicted value of the chroma component predicted according to the prediction model is closer to the true value of the chroma component. If the preset processing mode is grouping, since the luma component and the chroma component have different statistical characteristics, according to the difference in the statistical characteristics of the two colour components, the luma component is grouped, to balance the statistical characteristics of the two colour components before cross-component prediction. As a result, the prediction model is constructed according to the grouped luma component. In this case, the predicted value of the chroma component predicted according to the prediction model is closer to the true value of the chroma component. Furthermore, quantization and de-quantization are involved in the process of using the prediction model to predict the chroma component, and the luma component and the chroma component have different statistical characteristics. Due to the difference in the statistical characteristics of the two colour components, there may be differences between quantization and de-quantization. If the preset processing mode is quantization, the luma component and/or the chroma component can be quantized to balance the statistical characteristics of the two colour components before cross-component prediction. Thus, the processed luma component and/or the processed chroma component are obtained. In this case, the predicted value of the chroma component predicted according to the prediction model is closer to the true value of the chroma component. If the preset processing mode is de-quantization, the luma component and/or the chroma component can be de-quantized to balance the statistical characteristics of the two colour components before cross-component prediction. Thus, the processed luma component and/or the processed chroma component are obtained. In this case, the predicted value of the chroma component predicted according to the prediction model is closer to the true value of the chroma component. Therefore, the accuracy of the predicted value can be improved, that is, the prediction efficiency can be improved. Furthermore, since the predicted value of the chroma component predicted by the prediction model is closer to the true value, a predicted residual of the chroma component is smaller. In this way, less bit rate can be transmitted during coding and the coding efficiency in video coding can also be improved.

After the reference value of the first colour component of the current block and/or the reference value of the second colour component of the current block is obtained, based on the reference value of the first colour component of the current block, the first processing is performed on the first colour component using the preset processing mode, to balance the statistical characteristics of the two colour components before cross-component prediction, and then the processed value of the first colour component of the current block is obtained. In other implementations, based on the reference value of the second colour component of the current block, the first processing is performed on the first colour component using the preset processing mode, to balance the statistical characteristics of the two colour components before cross-component prediction, and then the processed value of the first colour component of the current block is obtained. In other implementations, based on the reference value of the first colour component of the current block and the reference value of the second colour component of the current block, the first processing is performed on the first colour component using the preset processing mode, to balance the statistical characteristics of the two colour components before cross-component prediction, and then the processed value of the first colour component of the current block is obtained. According to the processed value of the first colour component of the current block, the predicted value of the second colour component predicted by the prediction model is closer to the true value. The prediction model can achieve cross-component prediction of the second colour component using the first colour component.

Furthermore, since various colour components have different resolutions, to facilitate construction of the prediction model, it is also necessary to adjust the resolution of the colour component (e.g., up-sampling or down-sampling the colour component), to reach a target resolution. In some examples, performing the first processing on the first colour component using the preset processing mode is in cascading with adjusting the resolution. In other examples, performing the first processing on the first colour component using the preset processing mode is combined with adjusting the resolution.

In some implementations, before pre-processing the at least one colour component of the current block to obtain the at least one pre-processed colour component, the following is further performed.

A resolution of the first colour component is adjusted when the resolution of the first colour component of the current block is different from a resolution of the second colour component of the current block, where the adjusting includes up-sampling or down-sampling.

The reference value of the first colour component of the current block is updated based on the adjusted resolution of the first colour component, where the adjusted resolution of the first colour component is the same as the resolution of the second colour component.

It is to be noted that, adjusting the resolution (or called resolution adjustment), that is, resolution mapping, refers to mapping the resolution of the first colour component to the adjusted resolution of the first colour component. Herein, resolution adjustment or resolution mapping can be achieved through up-sampling or down-sampling.

It is also to be noted that, in the case that performing the first processing on the first colour component using the preset processing mode is in cascading with performing resolution adjustment, performing resolution adjustment can be before performing the first processing on the first colour component using the preset processing mode. That is, before pre-processing the at least one colour component of the current block, if the resolution of the first colour component of the current block is different from the resolution of the second colour component of the current block, the resolution of the first colour component is adjusted and the reference value of the first colour component of the current block is updated based on the adjusted resolution of the first colour component.

In some implementations, after pre-processing the at least one colour component of the current block to obtain the at least one pre-processed colour component, the following is further performed.

A resolution of the first colour component is adjusted when the resolution of the first colour component of the current block is different from a resolution of the second colour component of the current block, where the adjusting includes up-sampling or down-sampling.

The processed value of the first colour component of the current block is updated based on the adjusted resolution of the first colour component, where the adjusted resolution of the first colour component is the same as the resolution of the second colour component.

It is to be noted that, in the case that performing the first processing on the first colour component using the preset processing mode is in cascading with performing resolution adjustment, performing resolution adjustment can be after performing the first processing on the first colour component using the preset processing mode. That is, after pre-processing the at least one colour component of the current block, if the resolution of the first colour component of the current block is different from the resolution of the second colour component of the current block, the resolution of the first colour component is adjusted and the processed value of the first colour component of the current block is updated based on the adjusted resolution of the first colour component.

In some implementations, the at least one colour component of the current block is pre-processed to obtain the at least one pre-processed colour component as follows.

A second processing is performed on the first colour component based on the reference value of the first colour component of the current block, or the reference value of the second colour component of the current block, or the reference value of the first colour component and the reference value of the second colour component, when a resolution of the first colour component of the current block is different from a resolution of the second colour component of the current block, where the second processing includes up-sampling and related processing of a preset processing mode, or includes down-sampling and the related processing of the preset processing mode.

A processed value of the first colour component of the current block is obtained according to a result of the second processing, where the processed resolution of the first colour component of the current block is the same as the resolution of the second colour component of the current block.

It is to be noted that, in the case that performing the first processing on the first colour component using the preset processing mode is combined with performing resolution adjustment, the processed value of the first colour component of the current block may be obtained after both the first processing and resolution adjustment are performed. That is, if the resolution of the first colour component of the current block is different from the resolution of the second colour component of the current block, the second processing is performed on the first colour component according to the reference value of the first colour component of the current block and/or the reference value of the second colour component of the current block, where the second processing combines two processing methods, i.e., the first processing and resolution adjustment. The second processing includes up-sampling and related processing of a preset processing mode, or includes down-sampling and the related processing of the preset processing mode, and the like. In this way, according to the result of the second processing, the processed value of the first colour component of the current block can be obtained, and the processed resolution of the first colour component of the current block is the same as the resolution of the second colour component of the current block.

Assuming that the prediction model is for predicting the chroma component by using the luma component, in this case, the colour component to-be-predicted is the chroma component and the colour component to-be-used is the luma component. The resolution of the luma component and the chroma component are different. After the target resolution of the chroma component is obtained, since the resolution of the luma component does not match the target resolution, the resolution of the luma component needs to be adjusted. For example, down-sampling is performed on the luma component, to make the adjusted resolution of the luma component match the target resolution. If the chroma component is used to predict the luma component, after the target resolution of the luma component is obtained, since the resolution of the chroma component does not match the target resolution, the resolution of the chroma component needs to be adjusted. For example, up-sampling is performed on the chroma component, to make the adjusted resolution of the chroma component match the target resolution. If a blue chroma component is used to predict a red chroma component, after the target resolution of the red chroma component is obtained, since the resolution of the blue chroma component is the same as the resolution of the red chroma component, there is no need to adjust the resolution of the blue chroma component. The resolution of the blue chroma component has already met the target resolution. In this way, subsequently, colour component prediction can be performed at the same resolution between the blue chroma component and the red chroma component.

Furthermore, after the at least one pre-processed colour component is obtained, a model parameter(s) of the prediction model needs to be determined according to the at least one pre-processed colour component, so as to construct the prediction model. In some implementations, for S403, the prediction model is constructed according to the at least one pre-processed colour component as follows.

The model parameter of the prediction model is determined according to the processed value of the first colour component and the reference value of the second colour component.

The prediction model is constructed according to the model parameter.

In the implementation, the prediction model can be a linear model, for example, a cross-component prediction technique such as CCLM prediction; the prediction model can also be a non-linear model, for example, a cross-component prediction technique such as a multiple model CCLM (MMLM) prediction, which includes multiple linear models. The following describes an example where the prediction model is a linear model, but the method for picture prediction of the implementation can also be applied to a non-linear model.

In an example, the model parameter includes a first model parameter (represented by $\alpha$) and a second model parameter (represented by $\beta$). $\alpha$ and $\beta$ can be calculated in a variety of ways, for example, using a preset factor calculation model constructed with a least square method, or a preset factor calculation model constructed with the maximum value and the minimum value, or even a preset factor calculation model constructed with other means. The disclosure is not limited thereto.

For example, the preset factor calculation model constructed with the least square method is used. The model parameters can be derived by minimizing the regression error of neighbouring reference sample values around the current block, for example, neighbouring reference values of the first colour component and neighbouring reference values of the second colour component, where the neighbouring reference values of the first colour component and the neighbouring reference values of the second colour component are obtained after pre-processing. As illustrated in the equation (1):

$$\begin{cases} \alpha = \dfrac{2N \cdot \sum (L(n) \cdot C(n)) - \sum L(n) \cdot \sum C(n)}{2N \cdot \sum (L(n) \cdot L(n)) - \sum L(n) \cdot \sum L(n)} \\ \beta = \dfrac{\sum C(n) - \alpha \cdot \sum L(n)}{2N} \end{cases} \quad (1)$$

where L(n) denotes neighbouring reference values of the down-sampled first colour component corresponding to the left side and the upper side of the current block, C(n) denotes neighbouring reference values of the second colour component corresponding to the left side and the upper side of the current block, N denotes the side length of the second colour component of the current block, and n=1, 2, . . . , 2N. The first model parameter $\alpha$ and the second model parameter $\beta$ can be obtained through the equation (1).

For another example, the preset factor calculation model constructed with the maximum value and the minimum value is used, which provides a simplified derivation method of model parameters. The model parameters can be derived according to the principle that two points determine one line by searching for the maximum value and the minimum value from the neighbouring reference values of the first colour component. As the preset factor calculation model illustrated in the equation (2):

$$\begin{cases} \alpha = \dfrac{L_{max} - L_{min}}{C_{max} - C_{min}} \\ \beta = L_{min} - \alpha \cdot C_{min} \end{cases} \quad (2)$$

where $L_{max}$ and $L_{min}$ respectively denote the maximum value and the minimum value searched from the neighbouring reference values of the down-sampled first colour component corresponding to the left side and the upper side of the current block, $C_{max}$ denotes a neighbouring reference value of the second colour component corresponding to a reference sample at a position corresponding to $L_{max}$ and $C_{min}$ denotes a neighbouring reference value of the second colour component corresponding to a reference sample at a position corresponding to $L_{min}$. The first model parameter $\alpha$ and the second model parameter $\beta$ can also be obtained through $L_{max}$ and $L_{min}$ as well as $C_{max}$ and $C_{min}$, and the equation (2).

After the first model parameter $\alpha$ and the second model parameter $\beta$ are obtained, the prediction model is constructed. Based on $\alpha$ and $\beta$, assuming that the first colour component is used to predict the second colour component, the constructed prediction model is illustrated in the equation (3), $$Pr\ ed_C[i,j] = \alpha \cdot Rec_L[i,j] + \beta \qquad (3)$$

where i, j represents a position coordinate of a sample in the current block, i represents the horizontal direction, j represents the vertical direction, Pr ed$_C$[i, j] represents a predicted value of the second colour component corresponding to a sample having a position coordinate of [i, j] in the current block, and Re $C_L$[i, j] represents a reconstructed value of the first colour component corresponding to the sample having the position coordinate of [i,j] in the same current block (after down-sampling).

In some implementations, for S403, after constructing the prediction model, the following is further performed.

Cross-component prediction is performed on the second colour component of the current block according to the prediction model, to obtain a predicted value of the second colour component of the current block.

It is to be noted that, according to the prediction model illustrated in the equation (3), the chroma component can be predicted by using the luma component, so that the predicted value of the chroma component can be obtained.

For the current block, after the prediction model is constructed, the colour component prediction can be performed according to the prediction model. In an example, it is possible to use the first colour component to predict the second colour component, such as using the luma component to predict the chroma component, to obtain a predicted value of the chroma component. In another example, it is possible to use the second colour component to predict the first colour component, such as using the chroma component to predict the luma component, to obtain a predicted value of the luma component. In still another example, it is possible to use the second colour component to predict the third colour component, such as using a blue chroma component to predict a red chroma component, to obtain a predicted value of the red chroma component. Before the prediction model is constructed, the at least one colour component of the current block is pre-processed to balance the statistical characteristics between the colour components before cross-component prediction, and then the prediction model is constructed using the at least one pre-processed colour component. This can improve the prediction efficiency.

According to the method for picture prediction of the implementation, the at least one colour component of the current block in the picture is determined; the at least one colour component of the current block is pre-processed to obtain the at least one pre-processed colour component; the prediction model is constructed according to the at least one pre-processed colour component, where the prediction model is used to perform cross-component prediction on the at least one colour component of the current block. In this way, before cross-component prediction is performed on the at least one colour component of the current block, the least one colour component is pre-processed, to balance statistical characteristics of various colour components before cross-component prediction, thereby improving the prediction efficiency. Furthermore, since the predicted value of the colour component predicted by the prediction model is closer to the true value, the predicted residual of the colour component is smaller. In this way, less bit rate can be transmitted during coding and the coding efficiency in video coding can also be improved.

Figure 5:
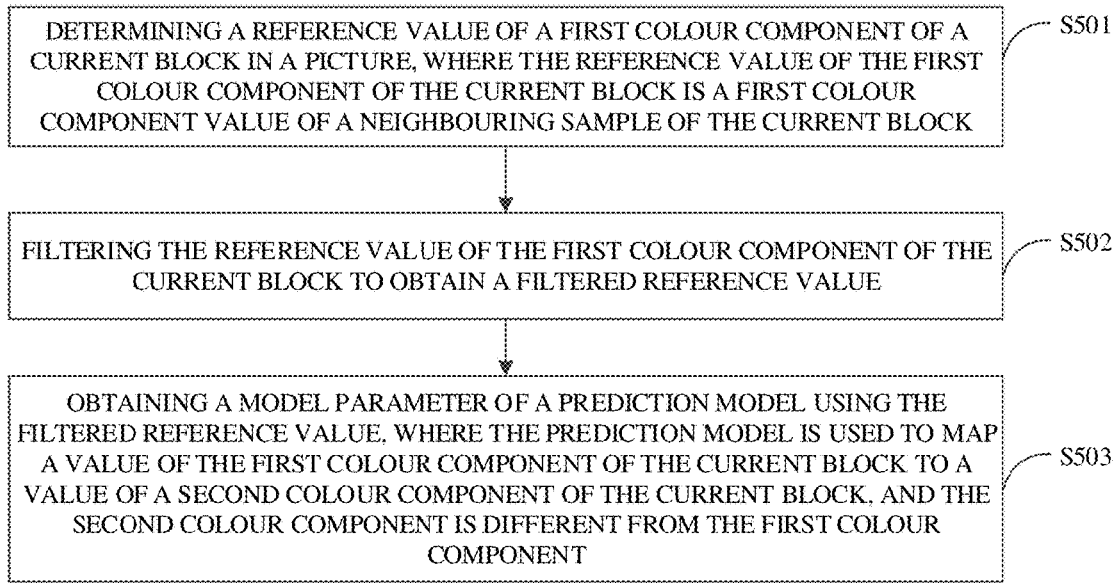
FIG. 5 is a schematic flowchart of a method for picture prediction according to other implementations.

Based on the above application scenarios in FIG. 2 or FIG. 3, FIG. 5 is a schematic flowchart of a method for picture prediction according to other implementations. The method includes the following.

At S501, a reference value of a first colour component of a current block in a picture is determined, where the reference value of the first colour component of the current block is a first colour component value of a neighbouring sample of the current block.

At S502, the reference value of the first colour component of the current block is filtered to obtain a filtered reference value.

At S503, a model parameter of a prediction model is obtained using the filtered reference value, where the prediction model is used to map a value of the first colour component of the current block to a value of a second colour component of the current block, and the second colour component is different from the first colour component.

It is to be noted that, the picture of the video can be partitioned into multiple picture blocks, and each picture block currently to be encoded can be called a coding block. Each coding block may include a first colour component, a second colour component, and a third colour component. The current block is a coding block in the picture for which prediction of the first colour component, the second colour component, or the third colour component is currently to be performed.

It is also to be noted that, the method for picture prediction of the implementation can be applied to a video encoding system or a video decoding system, or even can be applied to both the video encoding system and the video decoding system, which is not limited herein.

According to the implementation, the reference value of the first colour component of the current block in the picture is determined, where the reference value of the first colour component of the current block is the first colour component value of the neighbouring sample of the current block; the reference value of the first colour component of the current block is filtered to obtain the filtered reference value; the model parameter of the prediction model is obtained using the filtered reference value, where the prediction model is used to map the value of the first colour component of the current block to the value of the second colour component of the current block, and the second colour component is different from the first colour component. In this way, before cross-component prediction is performed on the at least one colour component of the current block, the least one colour component is filtered, to balance statistical characteristics of various colour components before cross-component prediction, thereby improving prediction efficiency as well as coding efficiency in video coding.

In some implementations, for S503, the model parameter of the prediction model is obtained using the filtered reference value as follows.

Characteristic statistics is performed on at least one colour component of the picture or at least one colour component of the current block, where the at least one colour component includes the first colour component, or the second colour component, or the first colour component and the second colour component.

A reference value of the second colour component of the current block is obtained according to a result of characteristic statistics, where the reference value of the second colour component of the current block is a second colour component value of a neighbouring sample of the current block.

The model parameter of the prediction model is obtained using the filtered reference value and the reference value of the second colour component of the current block.

It is to be noted that, different colour components have different statistical characteristics, i.e., there is a difference in the statistical characteristics of various colour components. For example, the luma component has rich texture characteristics while the chroma component tends to be more uniform and flat. In the implementation, the difference in the statistical characteristics of various colour components are considered, thereby balancing the statistical characteristics of various colour components.

The difference in the statistical characteristics of various colour components are considered, and the reference value of the second colour component of the current block is obtained. Thereafter, the model parameter of the prediction model is obtained according to the filtered reference value and the reference value of the second colour component of the current block, and the prediction model is constructed according to the obtained model parameter. The predicted value of the colour component predicted by the prediction model is closer to the true value, and thus a predicted residual of the colour component is smaller. In this way, less bit rate can be transmitted during coding and the coding efficiency in video coding can also be improved.

In some implementations, for S502, the reference value of the first colour component of the current block is filtered to obtain the filtered reference value as follows.

A first adjustment processing is performed on the reference value of the first colour component of the current block and the reference value of the first colour component of the current block is updated, when a resolution of the second colour component of the picture is different from a resolution of the first colour component of the picture, where the first adjustment processing includes one of: down-sampling filtering or up-sampling filtering.

The reference value of the first colour component of the current block is filtered to obtain the filtered reference value.

In some implementations, the method further includes the following.

The reference value is filtered using a preset processing mode according to the reference value of the first colour component of the current block, where the preset processing mode includes at least one of: filtering, grouping, value modification, quantization, de-quantization, low-pass filtering, or adaptive filtering.

In some implementations, for S502, the reference value of the first colour component of the current block is filtered to obtain the filtered reference value as follows.

A second adjustment processing is performed on a reference value of the second colour component of the current block and the reference value of the second colour component of the current block is updated, when a resolution of the second colour component of the picture is different from a resolution of the first colour component of the picture, where the second adjustment processing includes down-sampling and smoothing filtering, or up-sampling and smoothing filtering.

It is to be noted that, since various colour components have different resolutions, to facilitate construction of the prediction model, it is also necessary to adjust the resolution of the colour component (e.g., up-sampling or down-sampling the colour component) to reach a target resolution. Furthermore, adjusting the resolution (or called resolution adjustment), that is, resolution mapping, refers to mapping the resolution of the first colour component to the adjusted resolution of the first colour component. Herein, resolution adjustment or resolution mapping can be achieved through up-sampling or down-sampling.

In some examples, filtering the first colour component can be in cascading with adjusting the resolution. For example, performing resolution adjustment can be before filtering the first colour component, or performing resolution adjustment can be after filtering the first colour component. In other examples, filtering the first colour component can be combined with adjusting the resolution (i.e., the first adjustment processing).

In some implementations, for S503, the model parameter of the prediction model is obtained using the filtered reference value as follows.

A reference value of the second colour component of the current block is determined, where the reference value of the second colour component of the current block is a second colour component value of a neighbouring sample of the current block.

The model parameter of the prediction model is obtained using the filtered reference value and the reference value of the second colour component of the current block.

In some implementations, after S503, the following is further performed.

The value of the first colour component of the current block is mapped according to the prediction model, to obtain a predicted value of the second colour component of the current block.

It is to be noted that, the reference value of the second colour component of the current block is the second colour component value of the neighbouring sample of the current block. In this way, after the reference value of the second colour component is obtained, the model parameter of the prediction model is obtained according to the filtered reference value and the reference value of the second colour component, and the prediction model is constructed according to the obtained model parameter. The predicted value of the colour component predicted by the prediction model is closer to the true value, and thus the predicted residual of the colour component is smaller. In this way, less bit rate can be transmitted during coding and the coding efficiency in video coding can also be improved.

Figure 6:
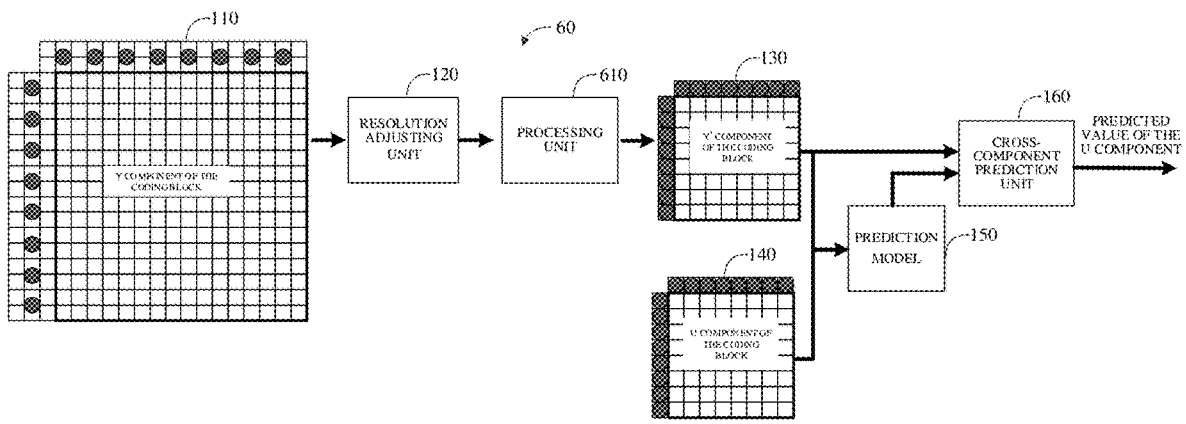
FIG. 6 is a schematic structural diagram of an improved architecture for cross-component prediction according to implementations.

FIG. 6 is a schematic structural diagram of an improved architecture for cross-component prediction according to implementations. As illustrated in FIG. 6, based on the related architecture 10 for cross-component prediction of FIG. 1, the improved architecture 60 for cross-component prediction further includes a processing unit 610. The processing unit 610 is configured to perform a related processing on the at least one colour component before the cross-component prediction unit 160. The processing unit 610 may be coupled before the resolution adjusting unit 120 or after the resolution adjusting unit 120. For example, in FIG. 6, the processing unit 610 is coupled after the resolution adjusting unit 120. The related processing, such as filtering, grouping, value modification, quantization, and de-quantization, etc., is performed on the Y component. In this way, a more accurate prediction model can be constructed, so that the predicted value of the U component obtained by the prediction is closer to the true value.

Based on the improved architecture 60 for cross-component prediction of FIG. 6, assuming that the Y component is used to predict the U component, since the Y component 110 of the current block and the U component 140 of the current block have different resolutions, the resolution adjusting unit 120 needs to adjust the resolution of the Y component, to obtain the $Y^1$ component 130 of the current block having the same resolution as the U component 140 of the current block. Prior to this, the processing unit 610 may also perform the related processing on the Y component, to obtain the $Y^1$ component 130 of the current block. Then, by using the neighbouring reference values $Y^1(n)$ of the $Y^1$ component 130 of the current block and the neighbouring reference values C(n) of the U component 140 of the current block, the prediction model 150 can be constructed. According to reconstructed sample values of the $Y^1$ component 130 of the current block and the prediction model 150, the colour component prediction is performed by the cross-component prediction unit 160 to obtain the predicted value of the U component. Since the Y component is subjected to the related processing before cross-component prediction, the prediction model 150 is constructed according to the processed luma component. The predicted value of the U component predicted by the prediction model 150 is closer to the real value, thereby improving the prediction efficiency as well as the coding efficiency in video coding.

Figure 7:
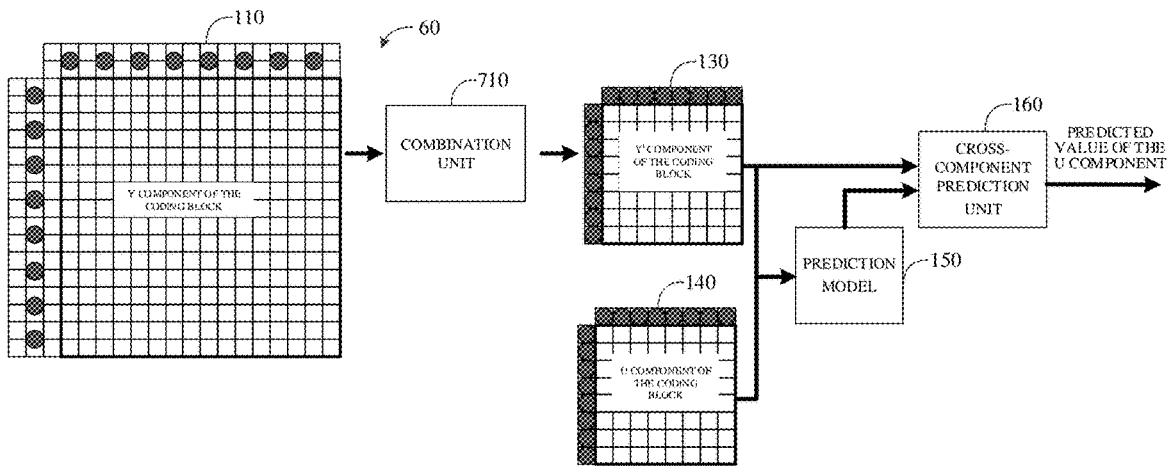
FIG. 7 is a schematic structural diagram of an improved architecture for cross-component prediction according to other implementations.

In the implementation, the resolution adjusting unit 120 and the processing unit 610 may perform a cascading processing on the colour components. For example, the resolution adjusting unit 120 first performs resolution adjustment, and then the processing unit 610 performs the related processing. For another example, the processing unit 610 first performs the related processing, and then the resolution adjusting unit 120 performs resolution adjustment. In the implementation, the resolution adjusting unit 120 and the processing unit 610 may also perform a combined processing on the colour components. For example, the resolution adjusting unit 120 and the processing unit 610 are combined to perform processing. FIG. 7 is a schematic structural diagram of an improved architecture for cross-component prediction according to other implementations. Based on the improved architecture 60 for cross-component prediction of FIG. 6, the improved architecture for cross-component prediction as illustrated in FIG. 7 also includes a combination unit 710, but the resolution adjusting unit 120 and the processing unit 610 are omitted. In other words, the combination unit 710 can achieve the functions of both the resolution adjusting unit 120 and the processing unit 610. The combination unit 710 can not only perform resolution adjustment on the at least one colour component, but also perform the related processing on the at least one colour component, such as filtering, grouping, value modification, quantization, and de-quantization, etc. In this way, the more accurate prediction model 150 can also be constructed. The predicted value of the U component predicted by the prediction model 150 is closer to the real value, thereby improving the prediction efficiency as well as the coding efficiency in video coding.

Furthermore, in the implementation, in the case that the method for picture prediction is applied to an encoder, the model parameter of the prediction model can be obtained according to the reference value of the colour component to-be-predicted of the current block and the reference value of the colour component to-be-referenced of the current block. The obtained model parameter is signaled in a bitstream. The bitstream is transmitted from the encoder to a decoder. Accordingly, in the case that the method for picture prediction is applied to a decoder, by parsing the bitstream, the model parameter of the prediction model is obtained, to construct the prediction model, and the prediction model is used to perform cross-component prediction on the at least one colour component of the current block.

According to the method of picture prediction, the reference value of the first colour component of the current block in the picture is determined, where the reference value of the first colour component of the current block is the first colour component value of the neighbouring sample of the current block; the reference value of the first colour component of the current block is filtered to obtain the filtered reference value; the model parameter of the prediction model is obtained using the filtered reference value, where the prediction model is used to map the value of the first colour component of the current block to the value of the second colour component of the current block, and the second colour component is different from the first colour component. In this way, before cross-component prediction is performed on the at least one colour component of the current block, the least one colour component is pre-processed, to balance statistical characteristics of various colour components before cross-component prediction, thereby improving the prediction efficiency. Furthermore, since the predicted value of the colour component predicted by the prediction model is closer to the true value, the predicted residual of the colour component is smaller. In this way, less bit rate can be transmitted during coding and the coding efficiency in video coding can also be improved.

Figure 8:
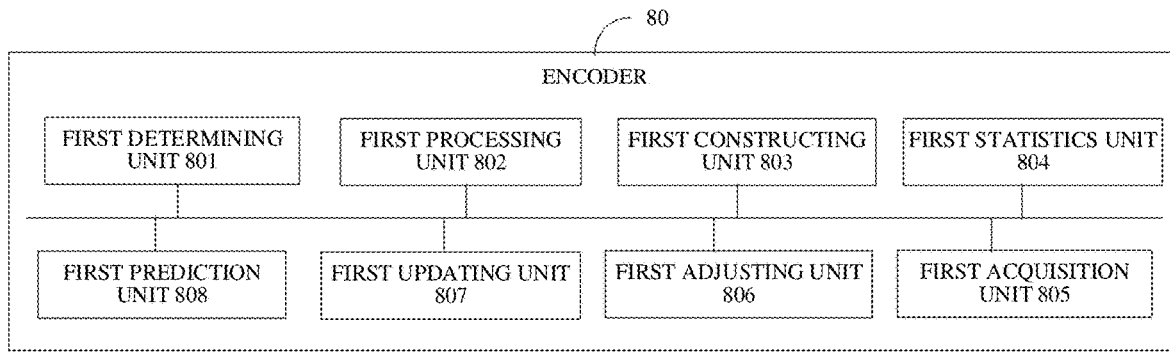
FIG. 8 is a schematic structural diagram of an encoder according to implementations.

FIG. 8 is a schematic structural diagram of an encoder 80 according to implementations. The encoder 80 includes a first determining unit 801, a first processing unit 802, and a first constructing unit 803.

The first determining unit 801 is configured to determine at least one colour component of a current block in a picture.

The first processing unit 802 is configured to pre-process the at least one colour component of the current block to obtain at least one pre-processed colour component.

The first constructing unit 803 is configured to construct a prediction model according to the at least one pre-processed colour component, where the prediction model is used to perform cross-component prediction on the at least one colour component of the current block.

In the above solution, referring to FIG. 8, the encoder 80 can further include a first statistics unit 804 and a first acquisition unit 805.

The first statistics unit 804 is configured to perform characteristic statistics on the at least one colour component of the current block, where the at least one colour component includes a first colour component, or a second colour component, or the first colour component and the second colour component.

The first acquisition unit 805 is configured to obtain, according to a result of characteristic statistics, a reference value of the first colour component of the current block, or a reference value of the second colour component of the current block, or the reference value of the first colour component and the reference value of the second colour component, where the first colour component is a component used for prediction when the prediction model is constructed, and the second colour component is a component that is predicted when the prediction model is constructed.

In the above solution, the first processing unit 802 is further configured to perform a first processing on the first colour component using a preset processing mode, based on the reference value of the first colour component of the current block, or the reference value of the second colour component of the current block, or the reference value of the first colour component and the reference value of the second colour component, where the preset processing mode includes at least one of: filtering, grouping, value modification, quantization, or de-quantization.

The first acquisition unit 805 is further configured to obtain a processed value of the first colour component of the current block according to a result of the first processing.

In the above solution, referring to FIG. 8, the encoder 80 can further include a first adjusting unit 806 and a first updating unit 807.

The first adjusting unit 806 is configured to adjust a resolution of the first colour component when the resolution of the first colour component of the current block is different from a resolution of the second colour component of the current block, where the adjusting includes up-sampling or down-sampling.

The first updating unit 807 is configured to update the reference value of the first colour component of the current block based on the adjusted resolution of the first colour component, where the adjusted resolution of the first colour component is the same as the resolution of the second colour component.

In the above solution, the first adjusting unit 806 is further configured to adjust a resolution of the first colour component when the resolution of the first colour component of the current block is different from a resolution of the second colour component of the current block, where the adjusting includes up-sampling or down-sampling.

The first updating unit 807 is further configured to update the processed value of the first colour component of the current block based on the adjusted resolution of the first colour component, where the adjusted resolution of the first colour component is the same as the resolution of the second colour component.

In the above solution, the first adjusting unit 806 is further configured to perform a second processing on the first colour component based on the reference value of the first colour component of the current block, or the reference value of the second colour component of the current block, or the reference value of the first colour component and the reference value of the second colour component, when a resolution of the first colour component of the current block is different from a resolution of the second colour component of the current block, where the second processing includes up-sampling and related processing of a preset processing mode, or includes down-sampling and the related processing of the preset processing mode.

The first acquisition unit 805 is further configured to obtain a processed value of the first colour component of the current block according to a result of the second processing, where the processed resolution of the first colour component of the current block is the same as the resolution of the second colour component of the current block.

In the above solution, the first determining unit 801 is further configured to determine a model parameter of the prediction model according to the processed value of the first colour component and the reference value of the second colour component.

The first constructing unit 803 is configure to construct the prediction model according to the model parameter.

In the above solution, referring to FIG. 8, the encoder 80 can further include a first prediction unit 808. The first prediction unit 808 is configured to perform cross-component prediction on the second colour component of the current block according to the prediction model, to obtain a predicted value of the second colour component of the current block.

It can be understood that, in the implementation, a "unit" may be a part of a circuit, a part of a processor, a part of a program, or software, etc., which can be a module or not. In addition, in the implementation, the various components may be integrated into one processing unit, or each unit may be physically present, or two or more units may be integrated into one unit. The above-mentioned integrated unit can be implemented in the form of hardware or a software function unit.

The integrated unit may be stored in a computer readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and the like) to perform all or part of the steps described in the various implementations of the present disclosure. The memory includes various medium capable of storing program codes, such as a universal serial bus (USB) flash disk, a read-only memory (ROM), a random access memory (RAM), a removable hard disk, disk, compact disc (CD), or the like.

Implementations further provide a computer storage medium. The computer storage medium stores programs for picture prediction. When executed by at least one processor, the programs are configured to implement the operations of the method of the above implementations.

Figure 9:
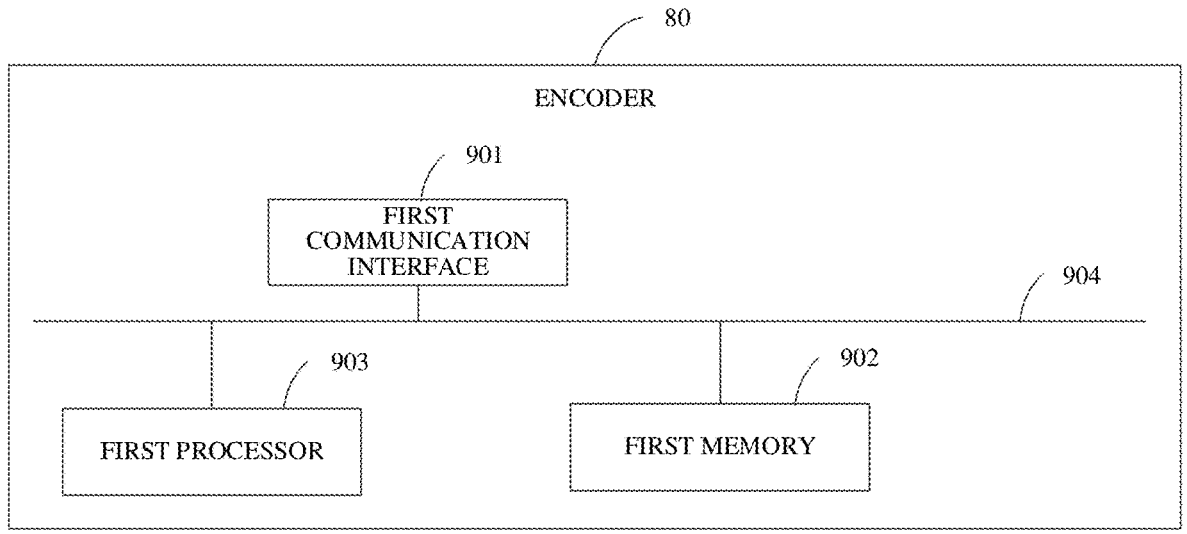
FIG. 9 is a schematic structural diagram of hardware of an encoder according to implementations.

Based on the structure of the encoder 80 and the computer storage medium, FIG. 9 is a schematic structural diagram of hardware of the encoder 80 according to implementations. The encoder 80 may include a first communication interface 901, a first memory 902, and a first processor 903, where various components are coupled together through a first bus system 904. It can be understood that, the first bus system 904 is used to implement connection and communication between these components. In addition to a data bus, the first bus system 904 also includes a power bus, a control bus, and a status signal bus. However, for clarity of description, in FIG. 9, various buses are marked as the first bus system 904.

The first communication interface 901 is used for receiving and sending signals in the process of sending/receiving information to/from other external network elements.

The first memory 902 is configured to store computer programs than can be run on the first processor 903.

The first processor 903 is configured to execute the following when running the computer programs.

At least one colour component of a current block in a picture is determined. The at least one colour component of the current block is pre-processed to obtain at least one pre-processed colour component. A prediction model is constructed according to the at least one pre-processed colour component, where the prediction model is used to perform cross-component prediction on the at least one colour component of the current block.

It can be understood that, the first memory 902 in the implementation may be a volatile memory or a non-volatile memory, or may include both volatile and non-volatile memory. The non-volatile memory may be a ROM, a programmable read-only memory (PROM), an erasable programmable read-only memory (EPROM), an electrically erasable programmable read-only memory (EEPROM) or flash memory. The volatile memory may be a RAM, which is used as an external cache. By way of example, but not limitation, many forms of RAM are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct memory bus random access memory (DRRAM). It is to be noted that the first memory 902 of the systems and methods described herein is intended to include, but is not limited to, these and any other suitable types of memory.

The first processor 903 in the implementation of this application may be an integrated circuit chip and has a signal processing capability. In the implementation process, each step of the foregoing method implementation may be completed by using an integrated logic circuit of hardware in the first processor 903 or an instruction in a form of software. The above first processor 903 may be a general-purpose processor, a digital signal processor (DSP), an application specific integrated circuit (ASIC), a field programmable gate array (FPGA), or other programming logic devices, discrete gate or transistor logic devices, discrete hardware components. Various methods, steps, and logical block diagrams disclosed in the implementations of this application can be implemented or executed. The general-purpose processor may be a microprocessor or the processor may be any conventional processor or the like. The steps of the method disclosed in combination with the implementations of this application may be directly implemented by a hardware decoding processor, or may be performed by using a combination of hardware and software modules in the decoding processor. The software module may be located in a mature storage medium such as a random access memory, a flash memory, a read-only memory, a programmable read-only memory, or an electrically erasable programmable memory, a register, and the like. The storage medium is located in the first memory 902, and the first processor 903 reads the information in the first memory 902 and completes the steps of the foregoing method in combination with its hardware.

It can be understood that these implementations described in the disclosure may be implemented by hardware, software, firmware, middleware, a microcode or a combination thereof. In case of implementation with the hardware, the processing unit may be implemented in one or more ASICs, DSPs, DSP devices (DSPDs), PLDs, FPGAs, universal processors, controllers, microcontrollers, microprocessors, other electronic units configured to execute the functions in the disclosure or combinations thereof. In case of implementation with the software, the technology of the disclosure may be implemented through the modules (for example, processes and functions) executing the functions in the disclosure. A software code may be stored in the memory and executed by the processor. The memory may be implemented inside the processor or outside the processor.

In another implementation, the first processor 903 is further configured to execute the method described in any of the foregoing implementations when running the computer programs.

According to the implementation, the encoder is provided and the encoder includes the first determining unit, the first processing unit, and the first constructing unit. The first determining unit is configured to determine the at least one colour component of the current block in the picture. The first processing unit is configured to pre-process the at least one colour component of the current block to obtain the at least one pre-processed colour component. The first constructing unit is configured to construct the prediction model according to the at least one pre-processed colour component, where the prediction model is used to perform cross-component prediction on the at least one colour component of the current block. In this way, before cross-component prediction is performed on the at least one colour component of the current block, the least one colour component is pre-processed, to balance statistical characteristics of various colour components before cross-component prediction, thereby improving prediction efficiency as well as coding efficiency in video coding.

Figure 10:
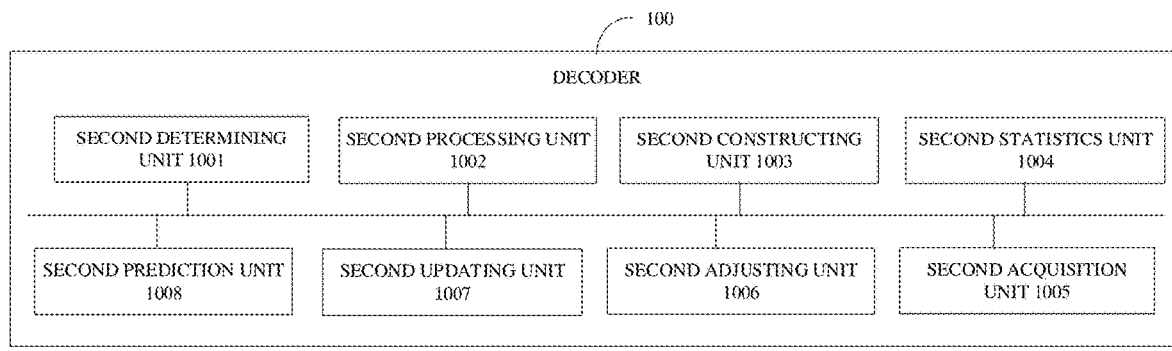
FIG. 10 is a schematic structural diagram of a decoder according to implementations.

Based on the similar inventive concept as the foregoing implementation, FIG. 10 is a schematic structural diagram of a decoder 100 according to implementations. The decoder 100 includes a second determining unit 1001, a second processing unit 1002, and a second constructing unit 1003.

The second determining unit 1001 configured to determine at least one colour component of a current block in a picture.

The second processing unit 1002 configured to pre-process the at least one colour component of the current block to obtain at least one pre-processed colour component.

The second constructing unit 1003 configured to construct a prediction model according to the at least one pre-processed colour component, where the prediction model is used to perform cross-component prediction on the at least one colour component of the current block.

In the above solution, referring to FIG. 10, the decoder 100 can further include a second statistics unit 1004 and a second acquisition unit 1005.

The second statistics unit 1004 is configured to perform characteristic statistics on the at least one colour component of the current block, where the at least one colour component includes a first colour component, or a second colour component, or the first colour component and the second colour component.

The second acquisition unit 1005 is configured to obtain, according to a result of characteristic statistics, a reference value of the first colour component of the current block, or a reference value of the second colour component of the current block, or the reference value of the first colour component and the reference value of the second colour component, where the first colour component is a component used for prediction when the prediction model is constructed, and the second colour component is a component that is predicted when the prediction model is constructed.

In the above solution, the second processing unit 1002 is further configured to perform a first processing on the first colour component using a preset processing mode, based on the reference value of the first colour component of the current block, or the reference value of the second colour component of the current block, or the reference value of the first colour component and the reference value of the second colour component, where the preset processing mode includes at least one of: filtering, grouping, value modification, quantization, or de-quantization.

The second acquisition unit 1005 is further configured to obtain a processed value of the first colour component of the current block according to a result of the first processing.

In the above solution, referring to FIG. 10, the decoder 100 can further include a second adjusting unit 1006 and a second updating unit 1007.

The second adjusting unit 1006 is configured to adjust a resolution of the first colour component when the resolution of the first colour component of the current block is different from a resolution of the second colour component of the current block, where the adjusting includes up-sampling or down-sampling.

The second updating unit 1007 is configured to update the reference value of the first colour component of the current block based on the adjusted resolution of the first colour component, where the adjusted resolution of the first colour component is the same as the resolution of the second colour component.

In the above solution, the second adjusting unit 1006 is further configured to adjust a resolution of the first colour component when the resolution of the first colour component of the current block is different from a resolution of the second colour component of the current block, where the adjusting includes up-sampling or down-sampling.

The second updating unit 1007 is further configured to update the processed value of the first colour component of the current block based on the adjusted resolution of the first colour component, where the adjusted resolution of the first colour component is the same as the resolution of the second colour component.

In the above solution, the second adjusting unit 1006 is further configured to perform a second processing on the first colour component based on the reference value of the first colour component of the current block, or the reference value of the second colour component of the current block, or the reference value of the first colour component and the reference value of the second colour component, when a resolution of the first colour component of the current block is different from a resolution of the second colour component of the current block, where the second processing includes up-sampling and related processing of a preset processing mode, or includes down-sampling and the related processing of the preset processing mode.

The second acquisition unit 1005 is further configured to obtain a processed value of the first colour component of the current block according to a result of the second processing, where the processed resolution of the first colour component of the current block is the same as the resolution of the second colour component of the current block.

In the above solution, the second determining unit 1001 is configured to parse the bitstream and construct the prediction model according to the model parameter obtained through parsing.

In the above solution, referring to FIG. 10, the decoder 100 can further include a second prediction unit 1008. The second prediction unit 1008 is configured to perform cross-component prediction on the second colour component of the current block according to the prediction model, to obtain a predicted value of the second colour component of the current block.

It can be understood that, in the implementation, a "unit" may be a part of a circuit, a part of a processor, a part of a program, or software, etc., which can be a module or not. In addition, in the implementation, the various components may be integrated into one processing unit, or each unit may be physically present, or two or more units may be integrated into one unit. The above-mentioned integrated unit can be implemented in the form of hardware or a software function unit.

The integrated unit may be stored in a computer readable storage medium when it is implemented in the form of a software functional unit and is sold or used as a separate product. Based on such understanding, implementations provide a computer storage medium. The computer storage medium stores programs for picture prediction which, when executed by the second processor, are configured to implement the method of any of the above implementations.

Figure 11:
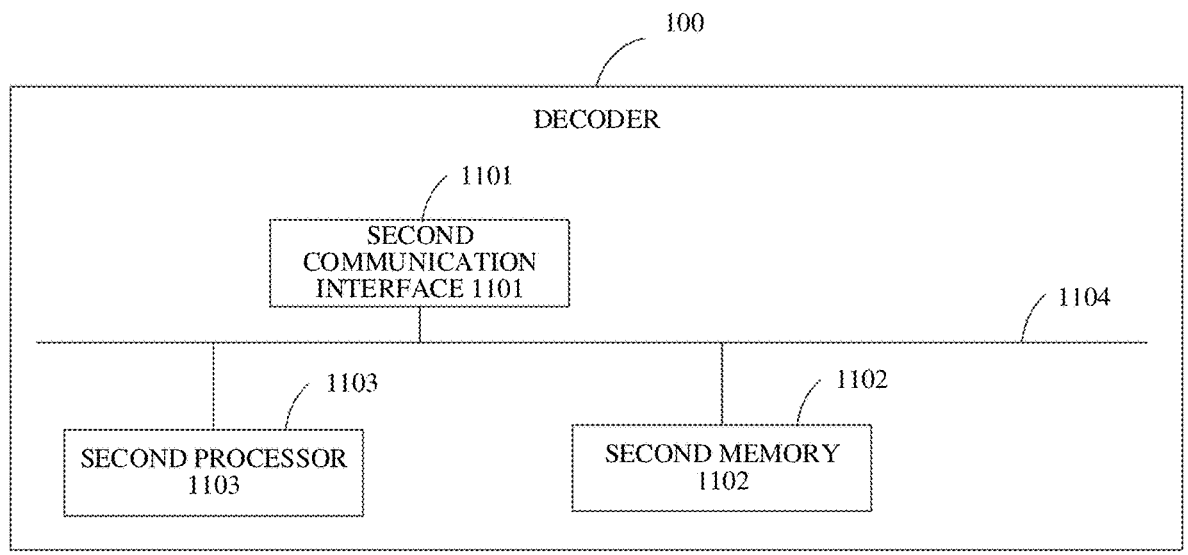
FIG. 11 is a schematic structural diagram of hardware of a decoder according to implementations.

Based on the structure of the decoder 100 and the computer storage medium, FIG. 11 is a schematic structural diagram of hardware of the decoder 100 according to implementations. The decoder 100 may include a second communication interface 1101, a second memory 1102, and a second processor 1103, where various components are coupled together through a second bus system 1104. It can be understood that, the second bus system 1104 is used to implement connection and communication between these components. In addition to a data bus, the second bus system 1104 also includes a power bus, a control bus, and a status signal bus. However, for clarity of description, in FIG. 11, various buses are marked as the second bus system 1104.

The second communication interface 1101 is used for receiving and sending signals in the process of sending/receiving information to/from other external network elements.

The second memory 1102 is configured to store computer programs than can be run on the second processor 1103.

The second processor 1103 is configured to execute the following when running the computer programs.

At least one colour component of a current block in a picture is determined. The at least one colour component of the current block is pre-processed to obtain at least one pre-processed colour component. A prediction model is constructed according to the at least one pre-processed colour component, where the prediction model is used to perform cross-component prediction on the at least one colour component of the current block.

In another implementation, the second processor 1103 is further configured to execute the method described in any of the foregoing implementations when running the computer programs.

It can be understood that, the functions of the second memory 1102 and the first memory 902 are similar, and the functions of the second processor 1103 and the first processor 903 are similar, which will not be described in detail herein.

According to the implementation, the decoder is provided and the decoder includes the second determining unit, the second processing unit, and the second constructing unit. The second determining unit is configured to determine the at least one colour component of the current block in the picture. The second processing unit is configured to pre-process the at least one colour component of the current block to obtain the at least one pre-processed colour component. The second constructing unit is configured to construct the prediction model according to the at least one pre-processed colour component, where the prediction model is used to perform cross-component prediction on the at least one colour component of the current block. In this way, before cross-component prediction is performed on the at least one colour component of the current block, the least one colour component is pre-processed, to balance statistical characteristics of various colour components before cross-component prediction, thereby improving prediction efficiency as well as coding efficiency in video coding.

It is to be noted that in this application, the terms "including", "containing" or any other variations thereof are intended to cover non-exclusive inclusion. As a result, a process, method, article, or device that includes a series of elements includes not only those elements, but also other elements that are not explicitly listed, or further includes elements inherent to the process, method, article, or device. If there are no more restrictions, the element defined by the sentence "including a . . . " does not exclude the existence of other same elements in the process, method, article, or device that includes the element.

The serial numbers of the foregoing implementations of this application are only for description, and do not represent the superiority of the implementations.

The methods disclosed in the several method implementations of this application can be combined without conflict to obtain new method implementations.

The features disclosed in the several product implementations of this application can be combined without conflict to obtain new product implementations.

The features disclosed in the several method implementations or device implementations of this application can be combined without conflict to obtain new method implementations or device implementations.

The above are some implementations of this application, but the protection scope of this application is not limited thereto. Any changes or substitutions that can be easily conceived by those skilled in the art within the technical scope disclosed by this application should be covered by the protection scope of this application. Therefore, the protection scope of this application should be subject to the protection scope of the claims.

INDUSTRIAL APPLICABILITY

According to the implementations, the at least one colour component of the current block in the picture is determined; the at least one colour component of the current block is pre-processed to obtain the at least one pre-processed colour component; the prediction model is constructed according to the at least one pre-processed colour component, where the prediction model is used to perform cross-component prediction on the at least one colour component of the current block. In this way, before cross-component prediction is performed on the at least one colour component of the current block, the least one colour component is pre-processed, to balance statistical characteristics of various colour components before cross-component prediction, thereby improving prediction efficiency as well as coding efficiency in video coding.

What is claimed is:

1. A method for picture prediction, implemented in an encoder and comprising:
    determining at least one colour component of a current block in a picture;
    pre-processing the at least one colour component of the current block to obtain at least one pre-processed colour component; and
    constructing a prediction model according to the at least one pre-processed colour component, wherein the prediction model is used to perform cross-component prediction on the at least one colour component of the current block, wherein
    the method further comprises:
    performing characteristic statistics on the at least one colour component of the current block, wherein the at least one colour component comprises a first colour component, or a second colour component, or the first colour component and the second colour component; and
    obtaining, according to a result of characteristic statistics, a reference value of the first colour component of the current block, or a reference value of the second colour component of the current block, or the reference value of the first colour component and the reference value of the second colour component, wherein the first colour component is a component used for prediction when the prediction model is constructed, and the second colour component is a component that is predicted when the prediction model is constructed.

2. The method of claim 1, wherein the at least one colour component comprises the first colour component and the second colour component, and the method further comprises:
    performing characteristic statistics on the first colour component and the second colour component of the current block, wherein the first colour component is a luma component, and the second colour component is a chroma component and the chroma component comprises a Cr component and a Cb component; and
    obtaining, according to the result of characteristic statistics, the reference value of the second colour component of the current block.

3. The method of claim 2, wherein pre-processing the at least one colour component of the current block to obtain the at least one pre-processed colour component comprises:
    filtering the first colour component based on the reference value of the first colour component of the current block; and
    obtaining a processed value of the first colour component of the current block according to a result of the filtering.

4. The method of claim 1, further comprising:
    adjusting a resolution of the first colour component when the resolution of the first colour component of the current block is different from a resolution of the second colour component of the current block, wherein the adjusting comprises up-sampling or down-sampling; and
    updating the reference value of the first colour component of the current block based on the adjusted resolution of the first colour component, wherein the adjusted resolution of the first colour component is the same as the resolution of the second colour component.

5. The method of claim 3, further comprising:
    adjusting a resolution of the first colour component when the resolution of the first colour component of the current block is different from a resolution of the second colour component of the current block, wherein the adjusting comprises up-sampling or down-sampling; and
    updating the processed value of the first colour component of the current block based on the adjusted resolution of the first colour component, wherein the adjusted resolution of the first colour component is the same as the resolution of the second colour component.

6. A method for picture prediction, implemented in a decoder and comprising:
    determining at least one colour component of a current block in a picture;

pre-processing the at least one colour component of the current block to obtain at least one pre-processed colour component; and constructing a prediction model according to the at least one pre-processed colour component, wherein the prediction model is used to perform cross-component prediction on the at least one colour component of the current block, wherein the method further comprises:

performing characteristic statistics on the at least one colour component of the current block, wherein the at least one colour component comprises a first colour component, or a second colour component, or the first colour component and the second colour component; and obtaining, according to a result of characteristic statistics, a reference value of the first colour component of the current block, or a reference value of the second colour component of the current block, or the reference value of the first colour component and the reference value of the second colour component, wherein the first colour component is a component used for prediction when the prediction model is constructed, and the second colour component is a component that is predicted when the prediction model is constructed.

7. The method of claim 6, wherein the at least one colour component comprises the first colour component and the second colour component, and the method further comprises:

performing characteristic statistics on the first colour component and the second colour component of the current block, wherein the first colour component is a luma component, and the second colour component is a chroma component and the chroma component comprises a Cr component and a Cb component; and obtaining, according to the result of characteristic statistics, the reference value of the second colour component of the current block.

8. The method of claim 7, wherein pre-processing the at least one colour component of the current block to obtain the at least one pre-processed colour component comprises:

filtering the first colour component based on the reference value of the first colour component of the current block; and obtaining a processed value of the first colour component of the current block according to a result of the filtering.

9. The method of claim 6, further comprising:

adjusting a resolution of the first colour component when the resolution of the first colour component of the current block is different from a resolution of the second colour component of the current block, wherein the adjusting comprises up-sampling or down-sampling; and updating the reference value of the first colour component of the current block based on the adjusted resolution of the first colour component, wherein the adjusted resolution of the first colour component is the same as the resolution of the second colour component.

10. The method of claim 8, further comprising:

adjusting a resolution of the first colour component when the resolution of the first colour component of the current block is different from a resolution of the second colour component of the current block, wherein the adjusting comprises up-sampling or down-sampling; and updating the processed value of the first colour component of the current block based on the adjusted resolution of the first colour component, wherein the adjusted resolution of the first colour component is the same as the resolution of the second colour component.

11. An encoder comprising a memory and a processor, wherein the memory is configured to store computer programs than can be run on the processor; and the processor is configured to execute the following when running the computer programs:

determining at least one colour component of a current block in a picture;

pre-processing the at least one colour component of the current block to obtain at least one pre-processed colour component; and constructing a prediction model according to the at least one pre-processed colour component, wherein the prediction model is used to perform cross-component prediction on the at least one colour component of the current block, wherein the processor is further configured to execute:

performing characteristic statistics on the at least one colour component of the current block, wherein the at least one colour component comprises a first colour component, or a second colour component, or the first colour component and the second colour component; and obtaining, according to a result of characteristic statistics, a reference value of the first colour component of the current block, or a reference value of the second colour component of the current block, or the reference value of the first colour component and the reference value of the second colour component, wherein the first colour component is a component used for prediction when the prediction model is constructed, and the second colour component is a component that is predicted when the prediction model is constructed.

12. The encoder of claim 11, wherein the at least one colour component comprises the first colour component and the second colour component, and the method further comprises:

performing characteristic statistics on the first colour component and the second colour component of the current block, wherein the first colour component is a luma component, and the second colour component is a chroma component and the chroma component comprises a Cr component and a Cb component; and obtaining, according to the result of characteristic statistics, the reference value of the second colour component of the current block.

13. The encoder of claim 12, wherein the processor configured to pre-process the at least one colour component of the current block to obtain the at least one pre-processed colour component is configured to execute:

filtering the first colour component based on the reference value of the first colour component of the current block; and obtaining a processed value of the first colour component of the current block according to a result of the filtering.

14. A decoder comprising a memory and a processor, wherein the memory is configured to store computer programs than can be run on the processor; and the processor is configured to execute the following when running the computer programs:

determining at least one colour component of a current block in a picture;

pre-processing the at least one colour component of the current block to obtain at least one pre-processed colour component; and constructing a prediction model according to the at least one pre-processed colour component, wherein the prediction model is used to perform cross-component prediction on the at least one colour component of the current block, wherein the processor is further configured to execute:

performing characteristic statistics on the at least one colour component of the current block, wherein the at least one colour component comprises a first colour component, or a second colour component, or the first colour component and the second colour component; and obtaining, according to a result of characteristic statistics, a reference value of the first colour component of the current block, or a reference value of the second colour component of the current block, or the reference value of the first colour component and the reference value of the second colour component, wherein the first colour component is a component used for prediction when the prediction model is constructed, and the second colour component is a component that is predicted when the prediction model is constructed.

15. The decoder of claim 14, wherein the at least one colour component comprises the first colour component and the second colour component, and the method further comprises:

performing characteristic statistics on the first colour component and the second colour component of the current block, wherein the first colour component is a luma component, and the second colour component is a chroma component and the chroma component comprises a Cr component and a Cb component; and obtaining, according to the result of characteristic statistics, the reference value of the second colour component of the current block.

16. The decoder of claim 15, wherein the processor configured to pre-process the at least one colour component of the current block to obtain the at least one pre-processed colour component is configured to execute:

filtering the first colour component based on the reference value of the first colour component of the current block; and obtaining a processed value of the first colour component of the current block according to a result of the filtering.

* * * * *